June 28, 1955 E. T. LORIG 2,711,815
ENDLESS METAL BELTS
Filed April 13, 1951
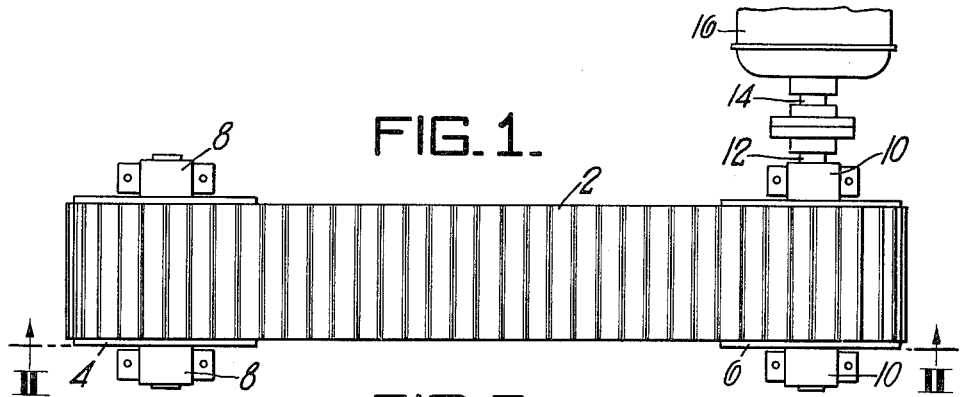
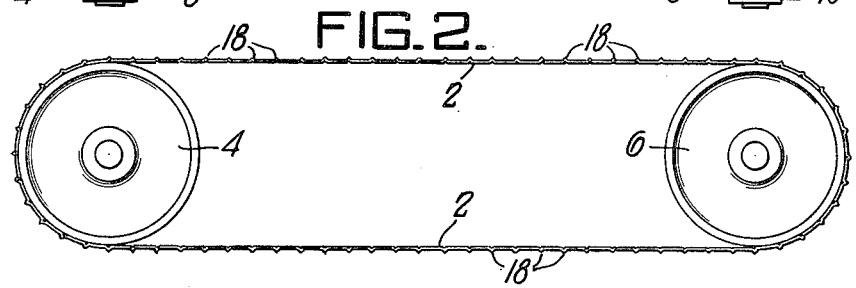
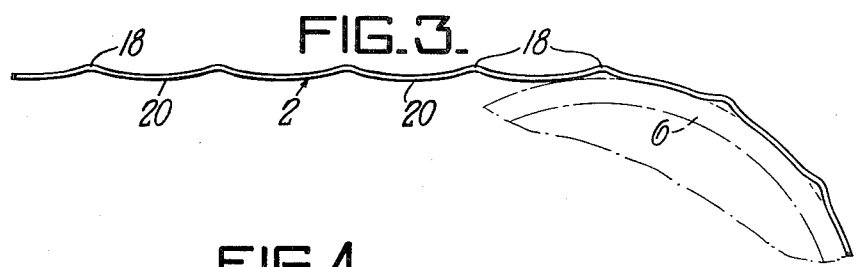
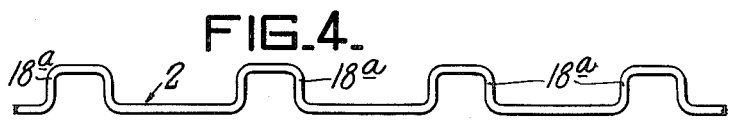
*Inventor:*
EDWIN T. LORIG,
by: Donald G. Dalton
his Attorney.

United States Patent Office 2,711,815
Patented June 28, 1955

2,711,815

ENDLESS METAL BELTS

Edwin T. Lorig, Ross Township, Allegheny County, Pa., assignor to United States Steel Corporation, a corporation of New Jersey Application April 13, 1951, Serial No. 220,911

4 Claims. (Cl. 198—193)

This invention relates to endless metal belts and more particularly to flat metal belts used in processing foods and the like. Belts used in these conveyors must be able to withstand elevated temperatures so that the usual type of flexible belt, such as those made of fabric and rubber, are not suitable and it is necessary to use metallic belts. Metal belts made of strip material are most desirable from the standpoint of cost but they are not suitable in most instances because they are not sufficiently flexible. Under some circumstances flat metal belts may be successfully used in conjunction with self-centering pulleys such as those disclosed in my prior Patents Nos. 2,593,157 and 2,593,158, both dated April 15, 1952. However, in systems having a slenderness ratio (the ratio of the distance between pulleys and the width of the belt) of less than 10 to 1, it is exceeding difficult to suitably track flat belts since there is a decided tendency for the belt to move off the pulleys. This tendency increases as the slenderness ratio decreases. Better results can be obtained by strengthening the pulley and bearing supports, but this is expensive and may result in straining the edges of the short belt beyond their elastic limit, or in straining the center fibers of the belt beyond their elastic limit if higher crowned automatic self-centering pulleys are used to maintain proper centering.

It is an object of my invention to provide an endless flat metal belt having improved tracking characteristics.

Another object is to provide a belt conveying system in which the belt can be kept centered without the use of expensive bearing supports.

These and other objects will be more apparent after referring to the following specification and attached drawings, in which:

Figure 1 is a plan view of the conveying system;

Figure 2 is a sectional view taken on the line II—II of Figure 1;

Figure 3 is an enlarged view of the belt of my invention;

Figure 4 is an enlarged view of a modified belt showing the belt in unstressed condition;

Figure 5 is a view of the belt of Figure 4 under tension; and

Figures 6 and 7 are views similar to Figures 4 and 5 showing another modification of my invention.

Referring more particularly to Figures 1, 2 and 3 of the drawings, the reference numeral 2 indicates an endless metal belt which passes around spaced apart pulleys 4 and 6. The pulleys 4 and 6 may be plain cylindrical rolls or automatic centering rolls of the types shown in my above mentioned copending applications. Rolls 4 and 6 are mounted in suitable bearings 8 and 10, respectively. One end of the shaft 12 extends beyond the bearing 10 and is connected to the shaft 14 of a motor 16. The belt 2 is made of strip metal with a plurality of spaced apart transverse crimps or corrugations 18 therein. These crimps are parallel to one another and may be either equally or unequally spaced. The spacing of the crimps depends upon the load on the strip and the spacing of the pulleys. The portions 20 between the crimps are slightly arcuate under tension with the outer surfafce being slightly concave. The natural free radius that the laterally crimped belt assumes after crimping is preferably approximately double the radius of the pulleys over which the crimped belt passes. The crimps may assume different shapes as shown at 18a and 18b in Figures 4 to 7, inclusive. The portions between the crimps 18a of the belt of Figures 4 and 5 are relatively straight when unstressed as shown in Figure 4, but assume a convex arcuate shape under tension as shown in Figure 5. The portions between the crimps 18b also assume a very slight convexity under tension as shown in Figure 7. While the belt is particularly advantageous when used with closely spaced pulleys, it may also be used with advantage on long belts. I have found that my belt has lateral and longitudinal flexibility and can be used under less tension than the standard belt. The corrugations or kinks also eliminate the need for belt take-ups when used in processes requiring heat. Localized concentrated stresses and strains are also eliminated by the use of my belt.

While several embodiments of my invention have been shown and described, it will be apparent that other adaptations and modifications may be made without departing from the scope of the following claims.

I claim:

1. A belt comprising an endless metal strip of a single thickness having a plurality of spaced apart transverse crimps therein extending the full width of the belt substantially at right angles to the longitudinal axis of the belt, said belt having substantially uniform normal longitudinal sections across its width, said strip having arcuate portions between the crimps, the outer surface of each of said arcuate portions being concave.

2. Belt driving apparatus comprising a pair of spaced apart pulleys, an endless strip metal belt of a single thickness passing around said pulleys, said belt having a plurality of spaced apart transverse crimps therein extending the full width of the belt substantially at right angles to the longitudinal axis of the belt, said belt having substantially uniform normal longitudinal sections across its width, said strip having arcuate portions between the crimps, the outer surface of each of said arcuate portions being concave.

3. Belt driving apparatus according to claim 2 in which the natural free radius of the crimped belt is equal to approximately twice the radius of the pulleys.

4. Belt driving apparatus comprising a pair of spaced apart pulleys, an endless strip metal belt of a single thickness passing around said pulleys, said belt having a plurality of spaced apart transverse crimps therein extending the full width of the belt substantially at right angles to the longitudinal axis of the belt, said belt having substantially uniform normal longitudinal sections across its width, the distance between centers of said pulleys being less than ten times the width of said belt, said strip having arcuate portions between the crimps, the outer surface of each of said arcuate portions being concave.

References Cited in the file of this patent

UNITED STATES PATENTS

| 548,591 | Rau | Oct. 22, 1895 |
| 1,824,858 | Williams | Sept. 29, 1931 |
| 1,846,431 | Mitchell | Feb. 23, 1932 |

FOREIGN PATENTS

| 302,747 | Germany | Dec. 20, 1917 |
| 596,412 | Germany | May 4, 1934 |
| 723,657 | France | Jan. 18, 1932 |